(12) United States Patent
Liang

(10) Patent No.: US 6,918,742 B2
(45) Date of Patent: Jul. 19, 2005

(54) COMBUSTION TURBINE WITH AIRFOIL HAVING MULTI-SECTION DIFFUSION COOLING HOLES AND METHODS OF MAKING SAME

(75) Inventor: George Liang, Palm City, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 130 days.

(21) Appl. No.: 10/235,154

(22) Filed: Sep. 5, 2002

(65) Prior Publication Data

US 2005/0042074 A1    Feb. 24, 2005

(51) Int. Cl.⁷ ............................................. F01B 5/18
(52) U.S. Cl. ..................................... 415/115; 416/97 R
(58) Field of Search .............. 415/115, 116; 416/96 R, 416/96 A, 97 R, 97 A

(56) References Cited

U.S. PATENT DOCUMENTS

| | | | |
|---|---|---|---|
| 4,197,443 A | 4/1980 | Sidenstick | 219/69 |
| 4,653,983 A * | 3/1987 | Vehr | 415/115 |
| 4,684,323 A * | 8/1987 | Field | 415/115 |
| 4,922,076 A * | 5/1990 | Cross et al. | 219/69.15 |
| 4,962,640 A | 10/1990 | Tobery | 60/39.02 |
| 5,117,626 A | 6/1992 | North et al. | 60/39.75 |
| 5,624,231 A | 4/1997 | Ohtomo et al. | 415/97 |
| 5,688,104 A | 11/1997 | Beabout | 415/115 |
| 5,690,472 A | 11/1997 | Lee | 416/97 |
| 5,813,836 A | 9/1998 | Starkweather | 416/97 |
| 5,931,638 A | 8/1999 | Krause et al. | 416/97 |
| 6,120,249 A | 9/2000 | Hultgren et al. | 416/97 |
| 6,126,396 A | 10/2000 | Doughty et al. | 416/97 |
| 6,183,199 B1 * | 2/2001 | Beeck et al. | 416/97 R |
| 6,368,060 B1 | 4/2002 | Fehrenbach et al. | 416/97 |

* cited by examiner

Primary Examiner—F. Daniel Lopez
Assistant Examiner—Richard A Edgar

(57) ABSTRACT

A combustion turbine 20 includes a housing 22 and a plurality of airfoils 40 radially and rotatably positioned within the housing. At least one interior cooling passageway 50 extends within the airfoil 40, and a plurality of diffusion holes 52 extend therefrom to a suction surface 46 and/or a pressure surface 48 of the airfoil. Each diffusion hole 52 has a proximal section 54 having a generally constant cross-sectional shape, and at least one other outwardly tapered section connected to the proximal section and defining a greater taper in a downstream gas flow direction than an upstream gas flow direction and a greater taper in a radially inward direction than a radially outward direction.

13 Claims, 5 Drawing Sheets

COMBUSTION TURBINE WITH AIRFOIL HAVING MULTI-SECTION DIFFUSION COOLING HOLES AND METHODS OF MAKING SAME

FIELD OF THE INVENTION

The present invention relates to the field of combustion turbines, and, more particularly, to combustion turbine airfoils.

BACKGROUND OF THE INVENTION

A combustion turbine is an engine that typically comprises a compressor to draw in and compress a gas (usually air), a combustor to add energy to the compressed gas, and a turbine driven by the resulting expansion of heated gas. The turbine, in turn, can be used to power a wide range of equipment including ships, aircraft, and power generators.

The turbine typically comprises one or more stages of blade assemblies extending from a rotatable shaft and stationary guide vanes usually located adjacent the combustor. The heated gas from the combustor, guided by the guide vanes, impinges upon the blade assemblies to drive the turbine.

Both the blade assemblies and guide vanes typically comprise airfoils. An airfoil of a blade assembly usually extends outwardly from a platform connected to a root. The root, in turn, is mounted to a turbine disk on the shaft. The hot gases from the combustor flow over the airfoils during operation of the combustion turbine causing the airfoils to rotate.

Because of the high temperatures of the gases, it may be desirable to cool the airfoils. U.S. Pat. No. 5,688,104 to Beabout, for example, discloses multiple cooling passageways that extend from a platform through an airfoil to carry cooling gas therein to a cooling or diffusion hole in an outer wall of the airfoil. Each diffusion hole comprises a metering section and a diffusing section, the later terminating at an opening in the surface of the airfoil wall. Each opening expands symmetrically in a radially outward and a radially inward direction to diffuse cool air from a corresponding passageway into the path of the hot gases carried by a gas flow in a downstream gas flow direction. The cooling gas provides a cooling film over the surface of the airfoil.

U.S. Pat. No. 6,368,060 to Fehrenbach et al. similarly discloses cooling passageways that terminate at corresponding diffusion holes that also have symmetrical expansions. In addition, Fehrenbach et al. discloses forming cooling holes with a high pressure fluid stream and coating the airfoil surface with a ceramic layer to assist in airfoil cooling.

Rotation of the airfoil of a blade assembly exerts a centrifugal force on the cooling gas molecules. Thus, the cooling gas may not properly diffuse as it exits a conventional, symmetrical diffusion hole. Reorienting a conventional, symmetrical diffusing hole, however, may result in an over expansion problem in the sense that the surface outlet of the cooling hole may open too much in a radially outward direction. The result may be separation of the hot gases carried in the downstream gas flow direction and their entry into the diffusion hole.

Similarly, if the diffusion hole expands in the upstream gas flow direction, the cooling gas may meet the hot gas at a perpendicular or more nearly perpendicular angle. This may result in further diminution of the cooling effect intended. It may also result in hot gas entering the diffusion hole. Accordingly, with conventional diffusion holes, one may be constrained to accept a less desirable orientation of the gas flow or risk causing an over expansion problem.

SUMMARY OF THE INVENTION

In view of the foregoing background, it is therefore an object of the present invention to provide enhanced cooling of a combustion turbine airfoil by creating a more even, more effective cooling film over the airfoil.

This and other objects, features, and advantages in accordance with the present invention are provided by diffusion holes in the airfoil defined by a proximal section having a generally constant cross-sectional shape, and, extending outwardly therefrom, at least one other outwardly tapered section having a greater taper in a downstream gas flow direction than an upstream gas flow direction and a greater taper in a radially inward direction than a radially outward direction. This permits a better diffusion of cooling gas. It also permits the diffusion hole to be oriented so that the cooling gas exits the diffusion hole at a better angle relative to the downstream flow of hot gas while, at the same time, reducing the likelihood of avoiding over expansion that could impede diffusion of the cooling gas and formation of the cooling film.

The diffusion holes may extend from at least one cooling passageway in the airfoil to a suction and/or pressure surface of the airfoil. The airfoil may also have a leading edge surface and a trailing edge surface, between which are pressure and suction surfaces. The airfoil, in turn, may be one of a plurality of airfoils radially positioned within a housing of a combustion turbine.

The at least one other outwardly tapered section of each diffusion hole may comprise a medial tapered section that has a cross-sectional shape tapering more along the downstream gas flow direction than the upstream gas flow direction. Indeed, the medial tapered section may have a cross-sectional shape having no taper in the upstream gas flow direction.

The at least one other outwardly tapered section may also comprise a distal tapered section. The distal tapered section may have a cross-sectional shape tapering more along the downstream gas flow direction than the upstream gas flow direction and tapering more along the radially inward direction than the radially outward direction.

The cross-sectional shape of the medial section may define distinct angular transitions with the proximal section. The cross-sectional shape of the distal section may also define distinct angular transitions with the medial section. Additionally, the proximal section may have a generally circular cross-sectional shape. The proximal section may also define an axis inclined at an angle relative to the downstream gas flow direction.

An additional aspect of the invention relates to a method for making diffusion holes in an airfoil for a combustion turbine. The method may include forming a plurality of diffusion holes to extend from an interior cooling passageway to at least one of the suction and pressure surfaces of the airfoil. Each diffusion hole may be formed, according to the method, to include a proximal section having a generally constant cross-sectional shape, and, connected thereto, at least one other outwardly tapered section defining a greater taper in a downstream gas flow direction than an upstream gas flow direction and a greater taper in a radially inward direction than a radially outward direction.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
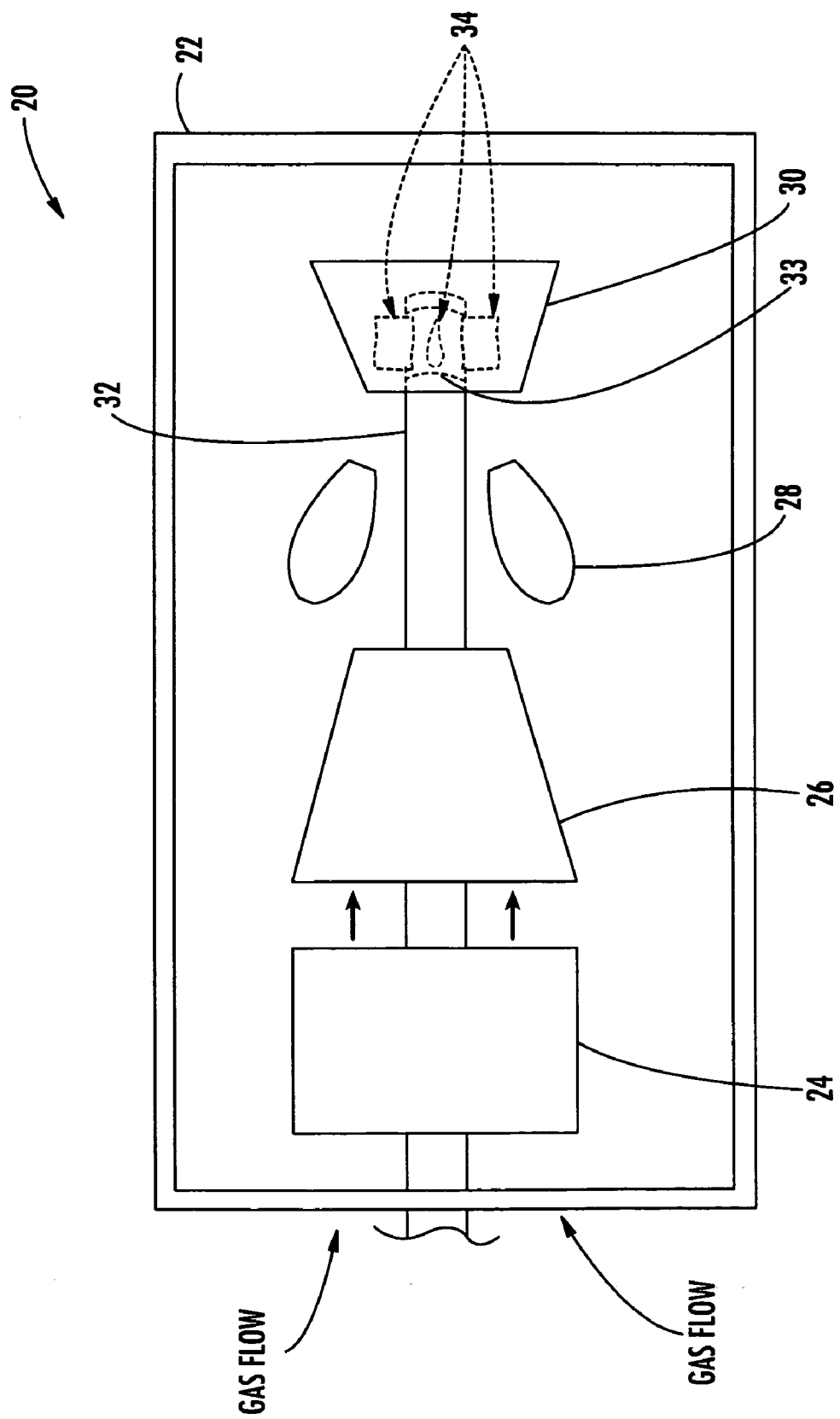
FIG. 1 is a schematic diagram of a combustion turbine including a plurality of airfoils, each having diffusion holes according to the present invention.
Figure 2:
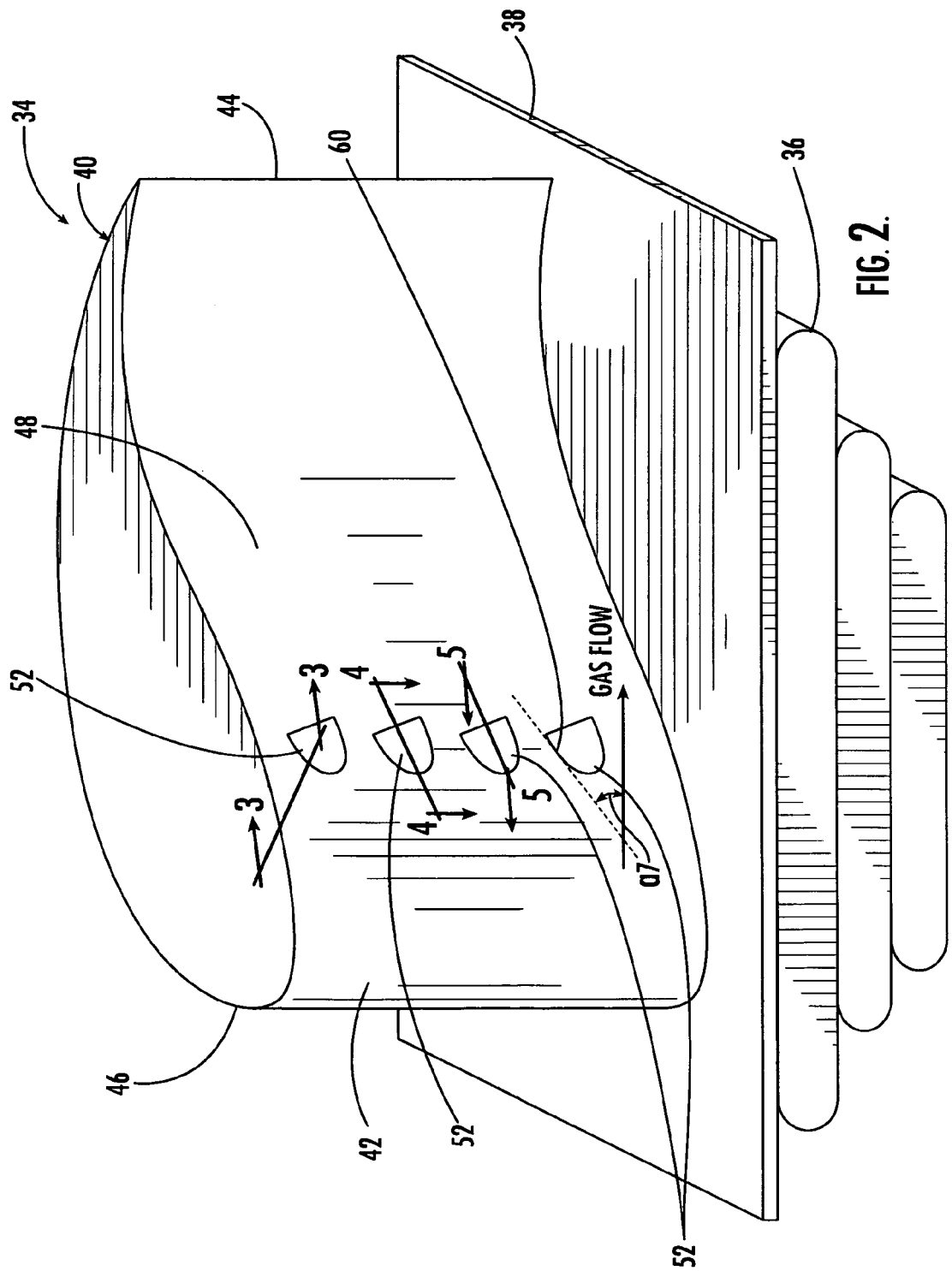
FIG. 2 is a perspective view of an airfoil of FIG. 1.

Referring initially to FIGS. 1 and 2, a combustion turbine 20 according to the present invention is described. The combustion turbine 20 illustratively includes a housing 22 and, within the housing, an inlet duct 24, a compressor 26 downstream from the inlet duct, a combustor 28 downstream from the compressor, and a turbine 30 downstream from the combustor. A shaft 32 (on a downstream end of which is turbine disk 33) illustratively extends through an upstream side of the housing 22 and from there extends downstream to the turbine 30. As will be readily understood by those skilled in the art, the combustion turbine 20 can be operated to rotate the shaft to thereby drive other equipment such as an electrical power generator, for example.

Within the housing 22, a plurality of blade assemblies 34 are illustratively mounted to the turbine disk 33 on the shaft 32. Each blade assembly 34 illustratively comprises a root 36 that connects to the turbine disk 33, a platform 38 connected to an upper portion of the root, and an airfoil 40 that extends in a radially outward direction from the platform. Accordingly, the combustion turbine 20 illustratively includes a plurality of airfoils radially positioned within the housing 22. So positioned, the airfoils 40 are rotatable based upon a gas flow thereover.

Each airfoil 40 illustratively comprises a leading edge surface 42 and a trailing edge surface 44. Illustratively, a suction surface 46 and a pressure surface 48 extend between the leading edge surface 42 and the trailing edge surface 44 as will be appreciated by those skilled in the art.

Figure 3:
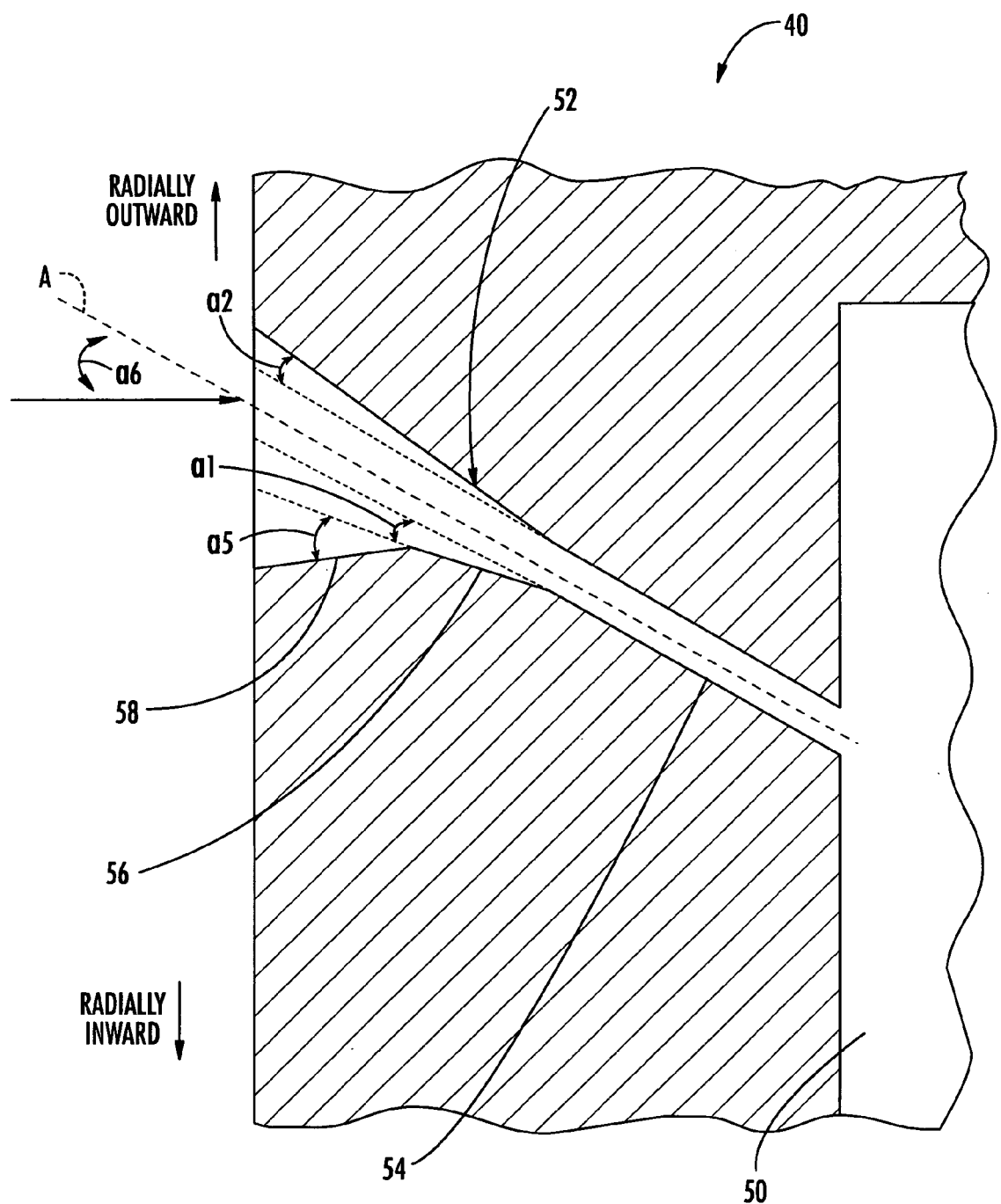
FIG. 3 is a cross-sectional view of a diffusion hole in the airfoil in FIG. 2 taken along line 3—3.
Figure 4:
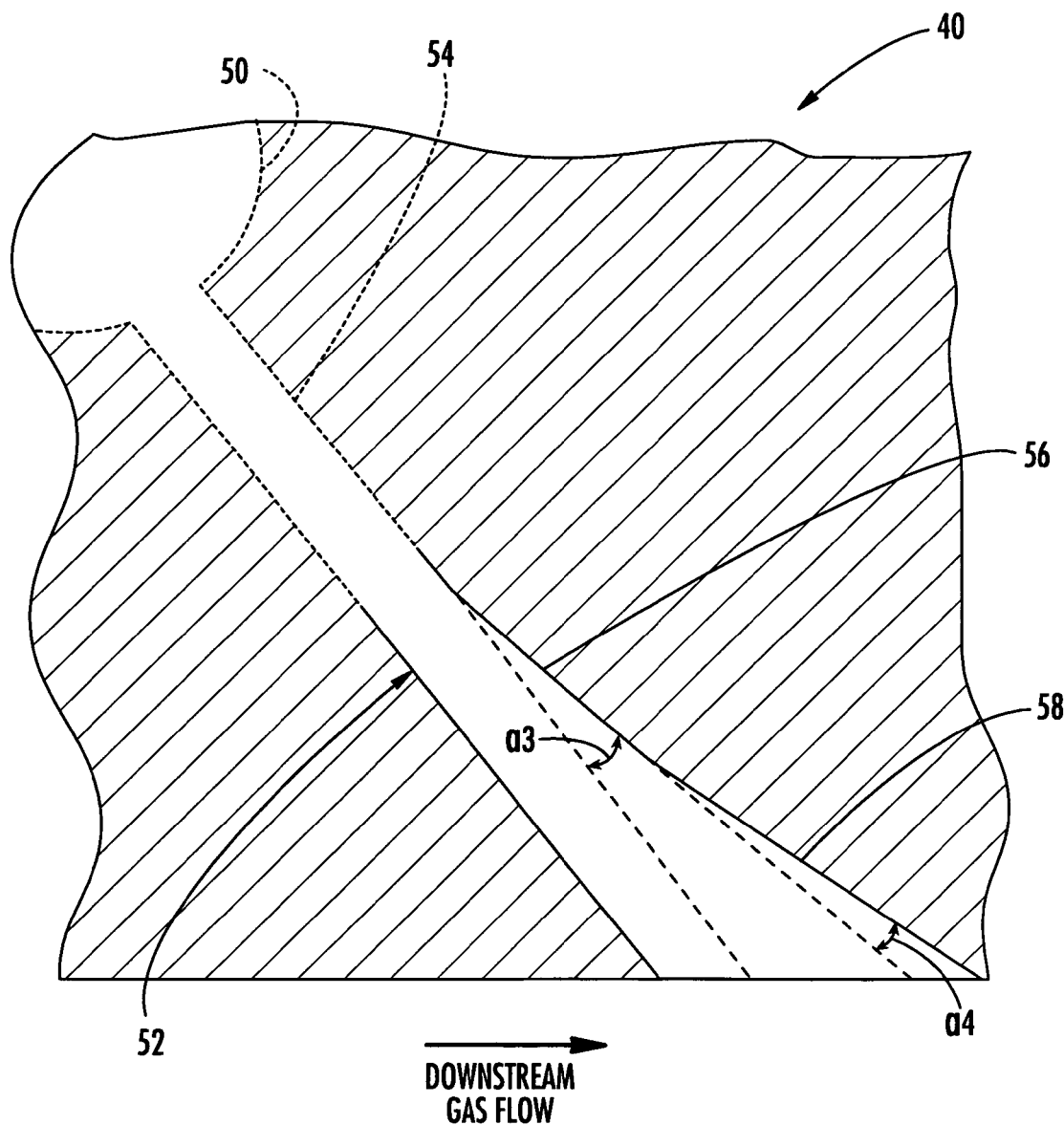
FIG. 4 is a different cross-sectional view of a diffusion hole of the airfoil in FIG. 2 taken along line 4—4.

Referring additionally now to FIGS. 3 and 4, each airfoil 40 illustratively includes at least one interior cooling passageway 50. As will be readily understood by those skilled in the art, an interior cooling passageway 50 may extend in a generally radial direction such that a cooling gas may be introduced into the interior passageway through corresponding cooling passageways (not shown) in the root 36 and platform 38 of the blade assembly 34.

Additionally, a plurality of diffusion holes 52, a representative one being illustrated, extend from the at least one interior cooling passageway 50 to at least one of the suction and pressure surfaces 46, 48. As illustrated, each diffusion hole 52 is defined by a proximal section 54 and at least one other outwardly tapered section connected thereto to define a greater taper in a downstream gas flow direction than an upstream gas flow direction and a greater taper in a radially inward direction than a radially outward direction.

The at least one other outwardly tapered section illustratively comprises a medial tapered section 56 having a cross-sectional shape tapering more along the downstream gas flow direction than the upstream gas flow direction. The cross-sectional shape of the medial tapered section 56 illustratively tapers outwardly from the proximal section along the downstream gas flow direction, along the radially inward direction, and along the radially outward direction at respective angles a1, a2, and a3. The angles a1, a2, and a3 may preferably be in a range of about 30 to about 70. Those skilled in the art will readily appreciate that other angles may alternately be used. The cross-sectional shape of the medial tapered section 56 may define distinct angular transitions with the proximal section 54, as shown, which facilitates manufacturing.

Additionally, the at least one other outwardly tapered section illustratively comprises a distal tapered section 58 having a cross-sectional shape tapering more along the downstream gas flow direction than the upstream gas flow direction, and tapering more along the radially inward direction than the radially outward direction. Illustratively, the distal tapered section 58 tapers outwardly from the medial tapered section 56 along the downstream gas flow direction and along the radially inward direction at respective angles a4 and a5. The angles a4 and a5 may preferably be in a range of about 7° to about 10°. Again, as will be readily understood by those skilled in the art, other angles may alternately be used. The cross-sectional shape of the distal tapered section 58 also may define distinct angular transitions with the medial tapered section 56 as illustrated.

Figure 5:
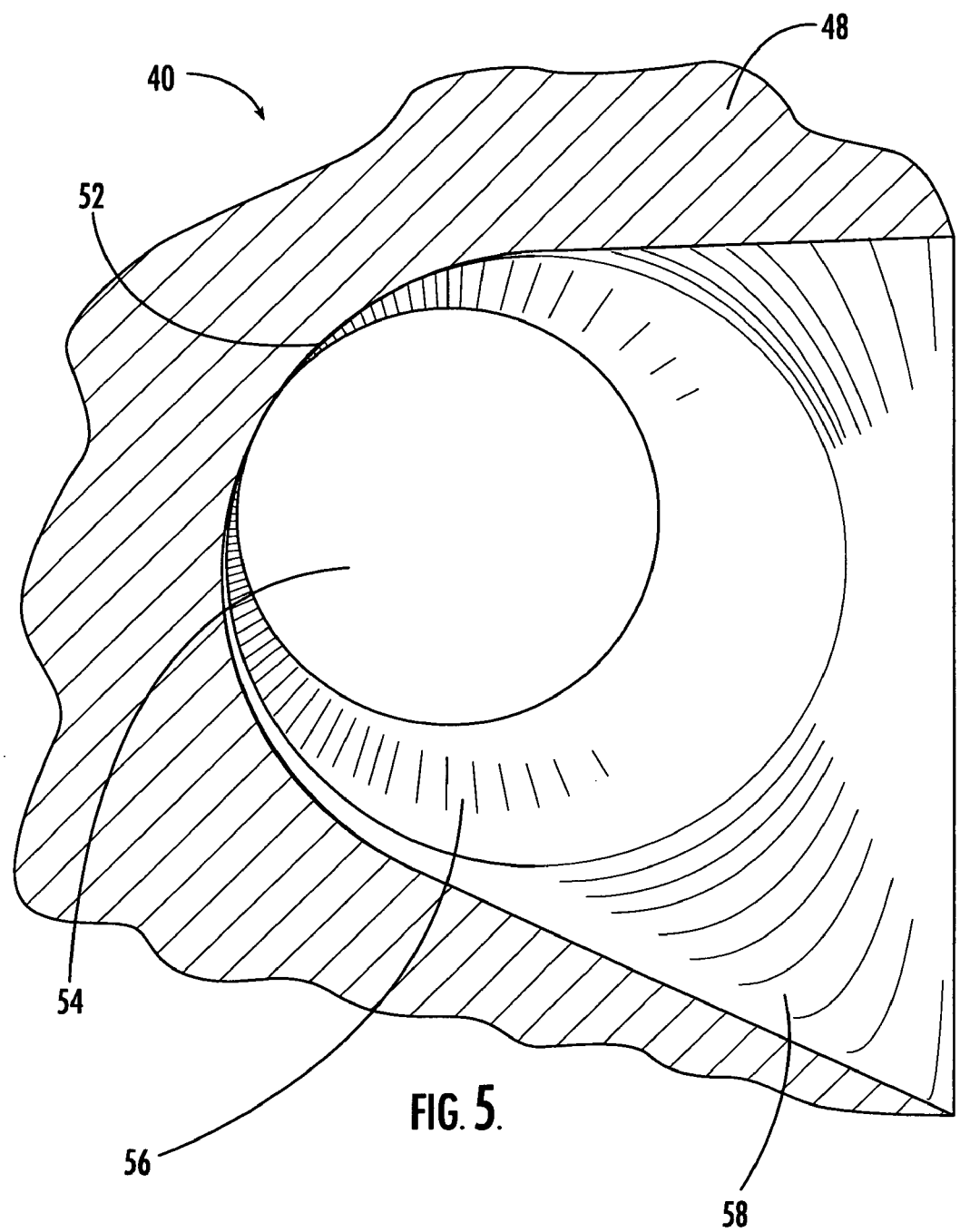
FIG. 5 is a different cross-sectional view of a diffusion hole of the airfoil in FIG. 2 taken along line 5—5.

The proximal section 54 of a diffusion hole 52, more particularly, has a generally constant cross-section so that it may provide a flow metering capability with respect to the cooling gas as will be readily understood by those skilled in the art. Referring additionally to FIG. 5, the proximal section 54 has a generally circular cross-sectional shape. As further illustrated, the proximal section 54 extends both outwardly and in a radially upward direction from the interior cooling passageway 50. The proximal section 54 thus defines an axis A inclined at an angle a6. The angle a6 preferably may be in a range of about 45° to about 55° relative to the downstream gas flow direction.

The proximal section 54 and both the medial tapered section 56 and the distal tapered section 58 provide a compound or multi-section diffusion configuration. The tapering of the sections permits the cooling gas to diffuse after it passes from the proximal section 54 so that a better distribution of gas may be achieved and, as a result, an enhanced cooling film over the airfoil 40 may be created as the cooling gas exits the diffusion hole 52.

The configuration also permits greater tapering in the downstream gas flow direction than in the upstream gas flow direction as described above. Thus, the lay back angle at which the exiting cooling gas meets the hot gas flowing over the surface of the airfoil 40, as readily understood by those skilled in the art, may be improved thereby to thus provide a better cooling film over the surface. It also may reduce a tendency toward formation of a hot gas vortex, as will also be readily understood by those skilled in the art.

At the same time, as illustrated, there may be no tapering of the diffusion holes 52 in the upstream gas flow direction. This reduces the risk that the exiting cooling gas will meet the hot gas flow at a perpendicular or more nearly perpendicular angle, which, as will be understood by those skilled in the art, could result in a less effective cooling film being created over the airfoil surface.

The configuration, moreover, permits greater tapering in the downstream gas flow direction than in the upstream gas flow direction. This not only provides a greater distribution of cooling gas at the surface of the airfoil (i.e., the breakout), but it also permits each diffusion hole 52 to be oriented at the surface of the airfoil 40 for better cooling gas distribution without an increase in the risk of hot gas entering the diffusion hole due to an over expansion.

Thus, the distal section 58 illustratively comprises a radially outward edge 60 at a surface portion (illustratively a portion of the pressure surface 48) of the airfoil 40. The radially outward edge 60 is illustratively at an angle a7 to the direction of the downstream gas flow. The angle a7 preferably may be in a range of about 45° to about 55° relative to the downstream gas flow direction. This permits cooling gas to exit the diffusion hole 52 at the surface of the airfoil in a direction more consistent with the flow tendency of the gas owing to the centrifugal force exerted on the cooling gas molecules as a result of the rotation of the airfoil 40 during operation of the combustion turbine 20.

An additional aspect of the invention relates to a method for making diffusion holes 52 in an airfoil 40 for a combustion turbine 20. The method comprises forming a plurality of diffusion holes 52 so that each extends from a cooling passageway 50 in the airfoil 40 to a suction surface 46 or a pressure surface 48 of the airfoil.

Forming, moreover, comprises forming each of the diffusion holes 52 such that each is defined by a proximal section 54 having a generally constant cross-sectional shape, and at least one other outwardly tapered section connected thereto to define a greater taper in a downstream gas flow direction than an upstream gas flow direction and a greater taper in a radially inward direction than a radially outward direction.

The at least one other outwardly tapered section may be formed according to the method to comprise a medial tapered section 56 having a cross-sectional shape tapering more along the downstream gas flow direction than the upstream gas flow direction. The cross-sectional shape of the medial tapered section 56 also may be formed to have no taper in the upstream gas flow direction. The at least one other outwardly tapered section further may be formed to also comprise a distal tapered section 58 having a cross-sectional shape tapering more along the downstream gas flow direction than the upstream gas flow direction and tapering more along the radially inward direction than the radially outward direction.

The method for making diffusion holes 52 in an airfoil 40 for a combustion turbine 20 may further comprise forming the distal tapered section 58 to have a radially outward edge 60 at a surface portion of the airfoil. The radially outward edge so formed may be at an angle in a range of about 45° to about 55° to the downstream gas flow direction. Forming, for example, may comprise using a laser or electro-discharge machining apparatus to form the diffusion holes 52 in the airfoil 40, as will be readily understood by those skilled in the art. Forming may alternatively comprise using a high-pressure fluid stream, as will also be readily understood by those skilled in the art.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. An airfoil for a combustion turbine comprising:
   a leading edge surface, a trailing edge surface, and suction and pressure surfaces extending between the leading and trailing edge surfaces, the pressure surface having a radially outward edge; and
   at least one interior cooling passageway and a plurality of diffusion holes extending from the at least one interior cooling passageway to at least one of the suction and pressure surfaces;
   each diffusion hole being defined by a proximal section having a generally constant cross-sectional shape, and an outwardly tapered distal section connected thereto to define a greater taper in a downstream gas flow direction than an upstream gas flow direction and a greater taper in a radially inward direction than a radially outward direction, and a medial tapered section having a cross-sectional shape tapering more along the downstream gas flow direction than the upstream gas flow direction with no taper in the upstream gas flow direction, and a smaller tapering angle at the medial tapered section than the distal tapered section and a distinct angular transition between the proximal and medial sections, wherein the radially outward edge of the pressure surface is at an angle to the direction of downstream gas flow from each diffusion hole to permit cooling gas to exit a diffusion hole in a direction more consistent with flow tendency of gas.

2. An airfoil according to claim 1 wherein the cross-sectional shape of the medial tapered section tapers outwardly from the proximal section along the downstream gas flow direction, radially inward direction and radially outward direction at respective angles in a range of about 3° to about 7°.

3. An airfoil according to claim 1 wherein the cross-sectional shape of the distal tapered section tapers outwardly from the medial tapered section along the downstream gas flow direction, and radially inward direction at respective angles in a range of about 7° to about 10°.

4. An airfoil according to claim 1 wherein the cross-sectional shape of the distal tapered section defines distinct angular transitions with the medial tapered section.

5. An airfoil according to claim 1 wherein the proximal section has a generally circular cross-sectional shape.

6. An airfoil according to claim 1 wherein the proximal section defines an axis inclined at an angle in a range of about 45° to about 55° relative to the downstream gas flow direction.

7. A combustion turbine comprising:
   a housing and a plurality of airfoils being radially positioned within said housing and being rotatable based upon a gas flow thereover;
   each airfoil having
   a leading edge surface, a trailing edge surface, and suction and pressure surfaces extending between the leading and trailing edge surfaces, the pressure surface having a radially outward edge, and
   at least one interior cooling passageway and a plurality of diffusion holes extending from the at least one interior cooling passageway to at least one of the suction and pressure surfaces;
   each diffusion hole being defined by a proximal section having a generally constant cross-sectional shape, and an outwardly tapered distal section connected thereto to define a greater taper in a downstream gas flow direction than an upstream gas flow direction and a greater taper in a radially inward direction than a radially outward direction, and a medial tapered section having a cross-sectional shape tapering more along the downstream gas flow direction than the upstream gas flow direction with no taper in the upstream gas flow direction, and a smaller tapering angle at the medial tapered section than the distal tapered section and a distinct angular transition between the proximal and medial sections, wherein the radially outward edge of the pressure surface is at an angle to the direction of downstream gas flow from each diffusion hole to permit cooling gas to exit a diffusion hole in a direction more consistent with flow tendency of gas.

8. A combustion turbine according to claim 1 wherein the cross-sectional shape of the medial tapered section tapers outwardly from the proximal section along the downstream gas flow direction, radially inward direction and radially outward direction at respective angles in a range of about 3° to about 7°.

9. A combustion turbine according to claim 1 wherein the cross-sectional shape of the distal tapered section tapers outwardly from the medial tapered section along the downstream gas flow direction, and radially inward direction at respective angles in a range of about 7° to about 10°.

10. A combustion turbine according to claim 1 wherein the cross-sectional shape of the distal tapered section defines distinct angular transitions with the medial tapered section.

11. A combustion turbine according to claim 1 wherein the proximal section has a generally circular cross-sectional shape.

12. A combustion turbine according to claim 1 wherein the proximal section defines an axis inclined at an angle in a range of about 45° to about 55° relative to the downstream gas flow direction.

13. A method for making diffusion holes in an airfoil for a combustion turbine, the airfoil to be radially positioned within a housing and being rotatable based upon gas flow thereover, the airfoil having a leading edge surface, a trailing edge surface, suction and pressure surfaces extending between the leading and trailing edge surfaces, the pressure surface having a radially outward edge and at least one interior cooling passageway, the method comprising:

forming a plurality of diffusion holes to extend from the at least one interior cooling passageway to at least one of the suction and pressure surfaces;

each diffusion hole being defined by a proximal section having a generally constant cross-sectional shape, and an outwardly tapered distal section connected thereto to define a greater taper in a downstream gas flow direction than an upstream gas flow direction and a greater taper in a radially inward direction than a radially outward direction, and a medial tapered section having a cross-sectional shape tapering more along the downstream gas flow direction than the upstream gas flow direction with no taper in the upstream gas flow direction, and a smaller tapering angle at the medial tapered section than the distal tapered section and a distinct angular transition between the proximal and medial sections, wherein the radially outward edge of the pressure surface is at an angle to the direction of downstream gas flow from each diffusion hole to permit cooling gas to exit a diffusion hole in a direction more consistent with flow tendency of gas.

\* \* \* \* \*